(12) United States Patent
Sumitomo et al.

(10) Patent No.: US 10,637,306 B2
(45) Date of Patent: Apr. 28, 2020

(54) STATOR, MOTOR USING STATOR, AND METHOD FOR MANUFACTURING STATOR

(71) Applicant: DAIKIN INDUSTRIES, LTD., Osaka-shi, Osaka (JP)

(72) Inventors: Hisato Sumitomo, Osaka (JP); Kazuo Ida, Osaka (JP); Akinobu Ishizaki, Osaka (JP); Hidemi Tanji, Osaka (JP); Akio Mutou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/762,514

(22) PCT Filed: Sep. 26, 2016

(86) PCT No.: PCT/JP2016/078319
§ 371 (c)(1),
(2) Date: Mar. 22, 2018

(87) PCT Pub. No.: WO2017/057297
PCT Pub. Date: Apr. 6, 2017

(65) Prior Publication Data
US 2018/0278101 A1 Sep. 27, 2018

(30) Foreign Application Priority Data
Sep. 30, 2015 (JP) .................. 2015-192936

(51) Int. Cl.
*H02K 1/14* (2006.01)
*H02K 1/27* (2006.01)
(Continued)

(52) U.S. Cl.
CPC .......... *H02K 1/146* (2013.01); *H02K 1/2706* (2013.01); *H02K 3/18* (2013.01); *H02K 3/522* (2013.01);
(Continued)

(58) Field of Classification Search
CPC ............ H02K 15/022; H02K 15/0435; H02K 15/095; H02K 1/146; H02K 1/2706; H02K 2203/06; H02K 3/18; H02K 3/522
(Continued)

(56) References Cited

U.S. PATENT DOCUMENTS 7,701,102 B2 * 4/2010 Amano .................. H02K 3/522
310/179
7,915,781 B2 * 3/2011 Futami ................... H02K 1/146
29/596
(Continued)

FOREIGN PATENT DOCUMENTS

CN 203911622 U 10/2014
EP 1 713 157 A1 10/2006
(Continued)

OTHER PUBLICATIONS

Translation of foreign document JP 2004274878 A (Year: 2004).*
(Continued)

*Primary Examiner* — Alex W Mok
(74) *Attorney, Agent, or Firm* — Global IP Counselors, LLP

(57) ABSTRACT

A stator for a simultaneous concentrated winding motor includes a core having 3×m teeth, and 3×m windings. The windings include at least a U1 winding and a U2 winding that belong to a U phase, a V1 winding and a V2 winding that belong to a V phase, and a W1 winding and a W2 winding that belong to a W phase. First lead wires of the U1 winding, the V1 winding, and the W1 winding extend, respectively, from the teeth on which the U1 winding, the V1 winding, and the W1 winding are arranged. First lead wires of the U2 winding, the V2 winding, and the W2 winding extend, respectively, from the teeth on which the U1 winding, the V1 winding, and the W1 winding are arranged.

13 Claims, 17 Drawing Sheets

(51) Int. Cl.
*H02K 3/18* (2006.01)
*H02K 3/52* (2006.01)
*H02K 15/02* (2006.01)
*H02K 15/04* (2006.01)
*H02K 15/095* (2006.01)

(52) U.S. Cl.
CPC ....... *H02K 15/022* (2013.01); *H02K 15/0435* (2013.01); *H02K 15/095* (2013.01); *H02K 2203/06* (2013.01)

(58) Field of Classification Search
USPC ........................................................ 310/179
See application file for complete search history.

(56) References Cited

U.S. PATENT DOCUMENTS

| | | | | |
|---|---|---|---|---|
| 2004/0083597 | A1* | 5/2004 | Ooiwa | H02K 3/28 29/596 |
| 2004/0201302 | A1* | 10/2004 | Tanaka | H02K 3/28 310/179 |
| 2006/0248707 | A1* | 11/2006 | Tanaka | H02K 3/28 29/597 |
| 2011/0241476 | A1 | 10/2011 | Burch et al. | |
| 2013/0200742 | A1 | 8/2013 | Seki et al. | |
| 2014/0354094 | A1 | 12/2014 | Yazaki et al. | |

FOREIGN PATENT DOCUMENTS

| | | | |
|---|---|---|---|
| JP | 06245442 | A * | 9/1994 |
| JP | 2003189525 | A * | 7/2003 |
| JP | 2004-274878 | A | 9/2004 |

OTHER PUBLICATIONS

International Preliminary Report of corresponding PCT Application No. PCT/JP2015/081683 dated Apr. 12, 2018.
European Search Report of corresponding EP Application No. 16 85 1468.5 dated Aug. 3, 2018.
International Search Report of corresponding PCT Application No. PCT/JP2016/078319 dated Dec. 20, 2016.

* cited by examiner

STATOR, MOTOR USING STATOR, AND METHOD FOR MANUFACTURING STATOR

CROSS-REFERENCE TO RELATED APPLICATIONS

This U.S. National stage application claims priority under 35 U.S.C. § 119(a) to Japanese Patent Application No. 2015-192936, filed in Japan on Sep. 30, 2015, the entire contents of which are hereby incorporated herein by reference.

TECHNICAL FIELD

The present invention relates to a stator, a motor using a stator, and a method for manufacturing a stator.

BACKGROUND ART

A stator used for a motor has a cylindrical core with projections called "teeth" and a plurality of windings composed of conductive wires wound around the respective teeth. In the manufacture of the stator, the step of winding the conductive wires around the teeth is carried out by a winding device such as the one disclosed in Japanese Patent Application Laid-open No. 2004-274878. The winding device has a plurality of nozzles that are provided in a radial direction. The nozzles revolve around the teeth to wind the conductive wires around the teeth while ejecting the conductive wires at the same time, thereby creating the windings. This method is called "simultaneous concentrated winding." Once this winding step is completed, two lead wires corresponding to both ends of each conductive wire extend from the plurality of completed windings.

SUMMARY

Technical Problem

Subsequent to the winding step, a connecting step is carried out in which an assembly operator connects part of multiple lead wires to create a power line and a neutral line. However, it is difficult to properly identify the lead wires to be connected from among many other lead wires. Such difficulty brings about a situation where the assembly operator connects wrong lead wires, thereby lowering the efficiency of manufacturing the stator or motor.

An object of the present invention is to provide a stator for a motor that can be manufactured efficiently with a low probability of defective products.

Solution to Problem

A stator for a simultaneous concentrated winding motor according to a first aspect of the present invention has a core, a plurality of windings, a plurality of first lead wires, and a plurality of second lead wires. The letter m represents an integer greater than or equal to 2. The core has 3×m teeth. The number of the plurality of windings is 3×m. The plurality of windings is arranged on the teeth respectively. The plurality of first lead wires and the plurality of second lead wires extend from the windings respectively. The plurality of windings each correspond to a U phase, a V phase, or a W phase. The 3×m windings include at least a U1 winding and a U2 winding that belong to the U phase, a V1 winding and a V2 winding that belong to the V phase, and a W1 winding and a W2 winding that belong to the W phase. The first lead wires of the U1 winding, the V1 winding, and the W1 winding extend, respectively, from the teeth on which the U1 winding, the V1 winding, and the W1 winding are arranged. The first lead wires of the U2 winding, the V2 winding, and the W2 winding extend, respectively, from the teeth on which the U1 winding, the V1 winding, and the W1 winding are arranged.

According to this configuration, the two first lead wires of the U1 winding and the U2 winding extend from the same tooth. The same is true for the two first lead wires of the V1 winding and the V2 winding and the two first lead wires of the W1 winding and the W2 winding. Therefore, since a plurality of lead wires to be connected are gathered, connection of wrong lead wires can be restrained, improving the efficiency of manufacturing the stator.

A stator according to a second aspect of the present invention is the stator according to the first aspect, wherein the 3×m windings further include a U3 winding belonging to the U phase, a V3 winding belonging to the V phase, and a W3 winding belonging to the W phase. The first lead wires of the U3 winding, the V3 winding, and the W3 winding extend, respectively, from the teeth on which the U3 winding, the V3 winding, and the W3 winding are arranged.

According to this configuration, in a motor that has nine or more windings, some first lead wires belonging to the same phase are arranged collectively. Thus, the lead wires can be connected easily.

A stator according to a third aspect of the present invention is the stator according to the first aspect, wherein the 3×m windings further include a U3 winding belonging to the U phase, a V3 winding belonging to the V phase, and a W3 winding belonging to the W phase. The first lead wires of the U3 winding, the V3 winding, and the W3 winding extend, respectively, from the teeth on which the U1 winding, the V1 winding, and the W1 winding are arranged.

According to this configuration, in a motor that has nine or more windings, three first lead wires belonging to the same phase are arranged collectively. Therefore, the lead wires can be connected more easily.

A stator according to a fourth aspect of the present invention is the stator according to the first aspect, wherein the 3×m windings further include a U3 winding and a U4 winding that belong to the U phase, a V3 winding and a V4 winding that belong to the V phase, and a W3 winding and a W4 winding that belong to the W phase. The first lead wires of the U3 winding, the V3 winding, and the W3 winding extend, respectively, from the teeth on which the U3 winding, the V3 winding, and the W3 winding are arranged. The first lead wires of the U4 winding, the V4 winding, and the W4 winding extend, respectively, from the teeth on which the U3 winding, the V3 winding, and the W3 winding are arranged.

According to this configuration, in a motor that has twelve or more windings, the first lead wires belonging to the same phase are arranged collectively. Therefore, the lead wires can be connected more easily.

A stator according to a fifth aspect of the present invention is the stator according to any one of the first to fourth aspects, wherein all of the second lead wires of the 3×m windings extend, respectively, from the teeth on which these windings are arranged.

According to this configuration, the second lead wires extend from the corresponding teeth thereof. Therefore, the assembly operator can easily understand that the lead wires that are arranged collectively are the first lead wires.

A motor according to a sixth aspect of the present invention has a stator and a rotor. The stator is the stator according to any one of the first to firth aspects. The rotor has a permanent magnet. The permanent magnet magnetically interacts with the stator.

According to this configuration, the two first lead wires of the U1 winding and the U2 winding extend from the same tooth. The same is true for the two first lead wires of the V1 winding and the V2 winding and the two first lead wires of the W1 winding and the W2 winding. Therefore, since the lead wires to be connected are gathered, connection of wrong lead wires can be restrained, improving the efficiency of manufacturing the motor.

A method for manufacturing a stator according to a seventh aspect of the present invention is to manufacture a stator by winding 3×m conductive wires around 3×m teeth of a core, thereby forming 3×m windings surrounding the teeth and 6×m lead wires extending from both ends of each of the windings, the m being an integer greater than or equal to 2. This method includes a step of preparing a winding device having 3×m nozzles capable of moving around the teeth while ejecting the 3×m conductive wires in a radial direction. The method includes a step of forming a first relative angle between the winding device and the core. The method includes a step of fixing part of the 3×m conductive wires by means of fixing tools and leaving the rest of the conductive wires unfixed. The method includes a step of moving each of the 3×m nozzles around one of the 3×m teeth. The method includes a step of forming a second relative angle between the winding device and the core by causing the winding device to rotate relatively about a central axis of the core. The method includes a step of fixing all of the 3×m conductive wires by means of fixing tools. The method includes a step of moving each of the 3×m nozzles around one of the 3×m teeth.

According to this method, crossover wires extending between the teeth are formed. Thus, since some of the lead wires to be connected are arranged collectively due to the presence of the crossover wires, connection of wrong lead wires can be restrained, improving the efficiency of manufacturing the stator.

A method for manufacturing a stator according to an eighth aspect of the present invention is the method according to the seventh aspect, wherein the core and the winding device rotate relative to each other by a central angle corresponding to an integral multiple of three teeth.

According to this configuration, the core and the 3×m nozzles rotate relative to each other by the central angle corresponding to an integral multiple of three teeth. Therefore, the efficiency of manufacturing a stator for a 3-phase motor can be improved.

A method for manufacturing a stator according to a ninth aspect of the present invention is the method according to the seventh aspect or the eighth aspect, wherein the 3× m windings are formed in a state in which the winding device and the core form the second relative angle.

According to this configuration, the crossover wires extending between the teeth and the lead wires including the crossover wires are extended at the stage of starting to wind the conductive wires, and held between the windings to be formed subsequently and the core. Therefore, the possibility that the crossover wires and the lead wires are displaced can be lowered.

Advantageous Effects of Invention

The stator for a simultaneous concentrated winding motor according to the first aspect can not only restrain wrong lead wires from being connected but also improve the efficiency of manufacturing the stator.

The stator according to the second to fourth aspects can facilitate connecting the lead wires.

The stator according to the fifth aspect can allow the assembly operator to readily know that the lead wires arranged collectively are the first lead wires.

The motor according to the sixth aspect can not only restrain wrong lead wires from being connected but also improve the efficiency of manufacturing the motor.

The method for manufacturing a stator according to the seventh and eighth aspects can not only restrain wrong lead wires from being connected but also improve the efficiency of manufacturing the stator.

The method for manufacturing a stator according to the ninth aspect can reduce the possibility that the crossover wires and the lead wires are displaced.

DESCRIPTION OF EMBODIMENTS

An embodiment of a stator and a motor according to the present invention is described hereinafter with reference to the drawings. It should be noted that specific configurations of the present invention are not limited to the following embodiment and therefore can be modified accordingly without departing from the scope of the present invention.

(1) Overall Configuration

Figure 1:
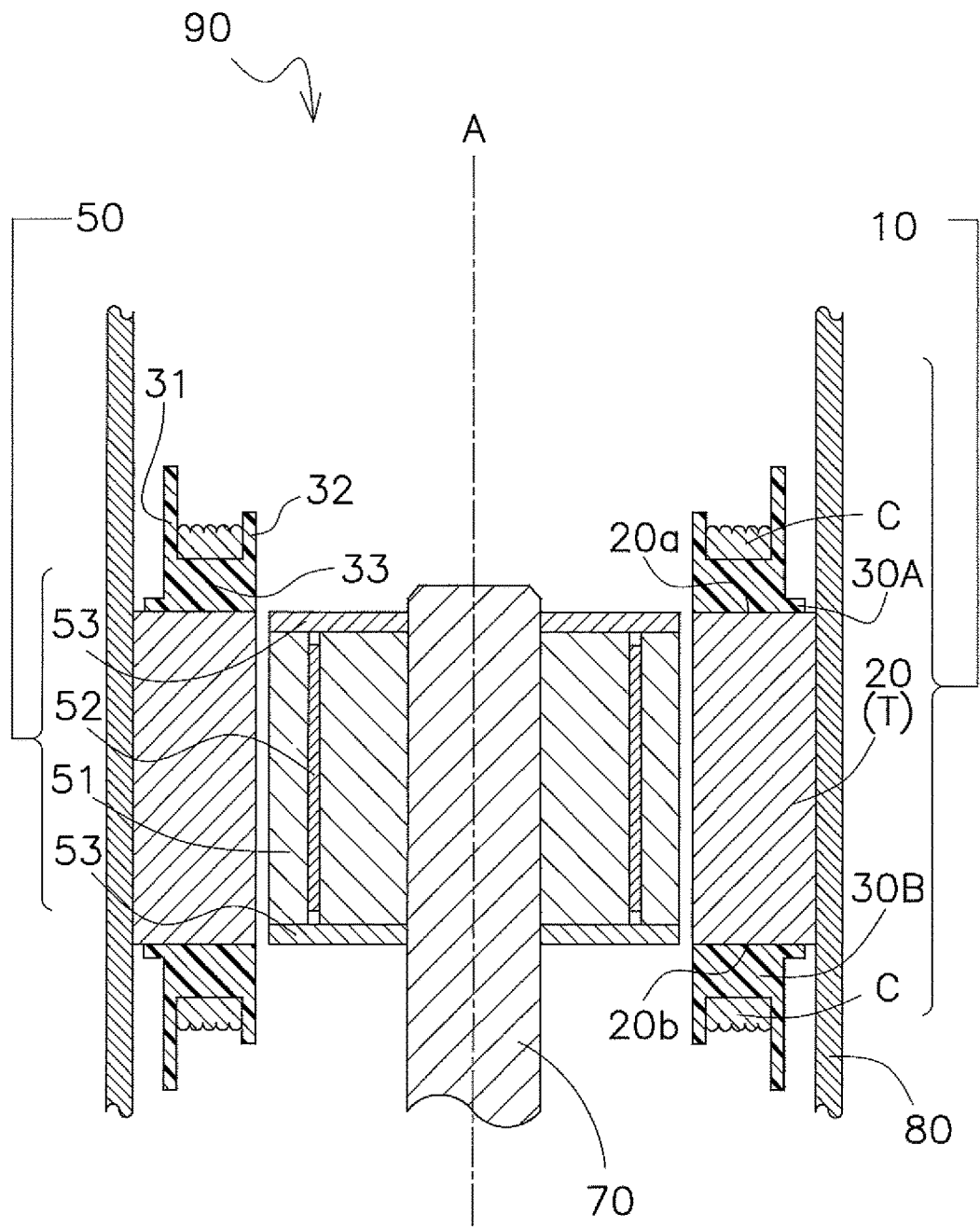
FIG. 1 is a cross-sectional view showing a motor 90 according to an embodiment of the present invention.

FIG. 1 shows a motor 90 according to an embodiment of the present invention. The motor 90 has a housing 80 for storing components, a stator 10 fixed to the housing 80, a rotor 50 disposed in a hollow space of the stator 10, and a shaft 70 fixed to the rotor 50. The rotor 50 rotates about a central axis A along with the shaft 70 by magnetically interacting with the stator 10. In order to achieve this magnetic interaction, the stator 10 has a winding C and the rotor 50 has a permanent magnet 52.

In addition to the winding C, the stator 10 has a stator core 20 made out of a laminated steel plate, and an upper insulator 30A and a lower insulator 30B that are mounted respectively on an upper surface 20a and a lower surface 20b of the stator core 20. The winding C is composed of a conductive wire that is wound around the stator core 20 and the two insulators 30A, 30B at once.

In addition to the permanent magnet 52, the rotor 50 has a rotor core 51 made out of a laminated steel plate, and two end plates 53 mounted respectively on an upper surface and a lower surface of the rotor core 51. The permanent magnet 52 is located in a through-hole that is formed in the rotor core 51, and bounded by the end plates 53.

(2) Detailed Configuration of the Stator 10

(2-1) Stator Core 20

Figure 2:
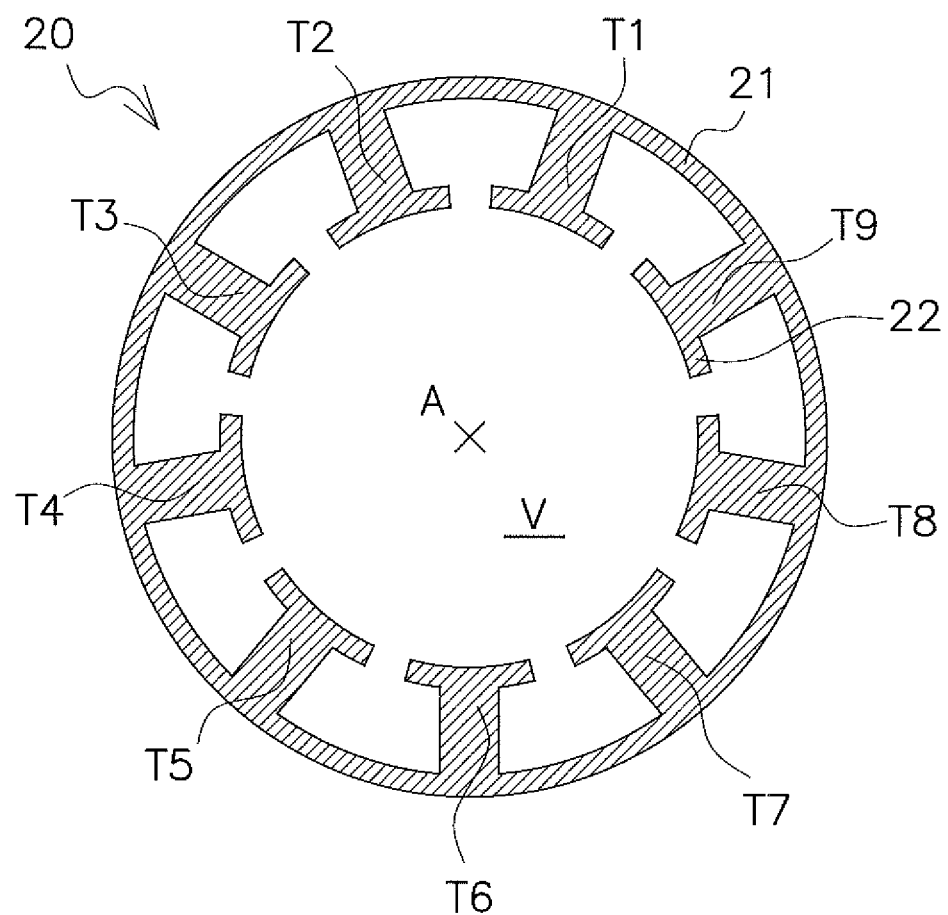
FIG. 2 is a plan view showing a stator core 20 constituting a stator 10.

FIG. 2 is a plan view showing the stator core 20 according to the present invention. The stator core 20 has nine poles formed in the stator 10 of the 3-phase motor 90.

The stator core 20 is, overall, in the shape of a cylinder with a hollow space V where the rotor 50 is to be mounted. The stator core 20 has an annular portion 21 configuring an outer edge of the stator core 20, nine teeth T1 to T9 projecting from the annular portion 21 toward the central axis A, and engaging portions 22 located at tips of the teeth T1 to T9. The teeth T1 to T9 are configured to form the winding C by having a conductive wire wound therearound.

(2-2) Insulators 30A, 30B

Figure 3:
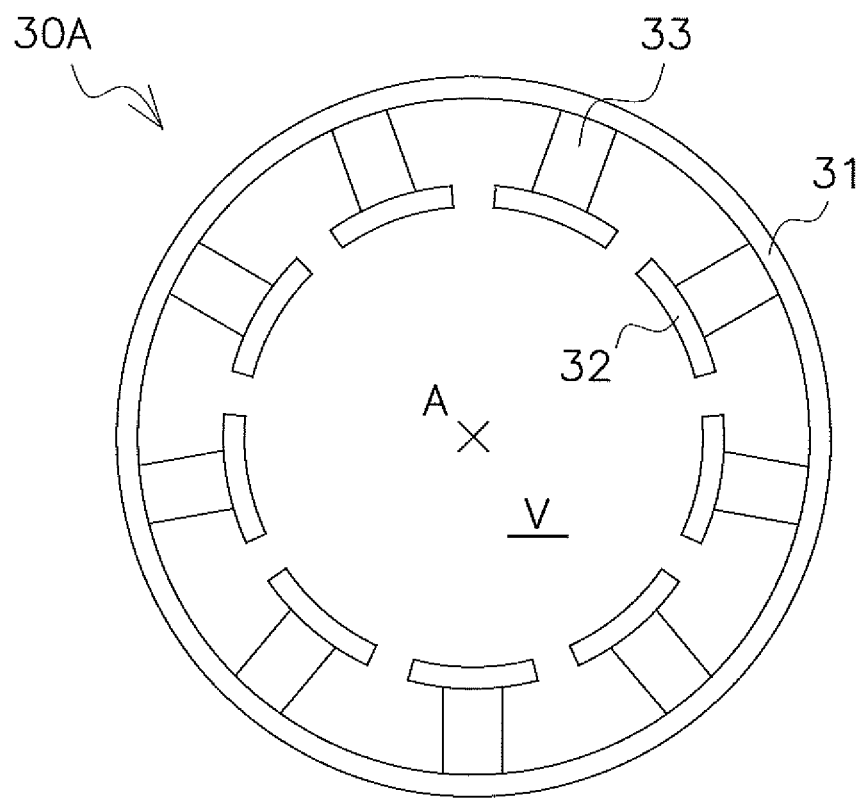
FIG. 3 is a plan view showing an upper insulator 30A constituting the stator 10.

FIG. 3 is a plan view showing the upper insulator 30A. The insulator 30A is made of resin. The insulator 30A has an outer wall 31, inner walls 32, and nine teeth covers 33. The outer wall 31 and the inner walls 32 overlap at least partially with the annular portion 21 and engaging portions 22 of the stator core 20, respectively. The teeth covers 33 cover the teeth T1 to T9 respectively.

The configuration of the lower insulator 30B shown in FIG. 1 is the same as that of the upper insulator 30A shown in FIG. 3

(3) How the Stator 10 is Typically Manufactured Using the Winding Device 100

Figure 4:
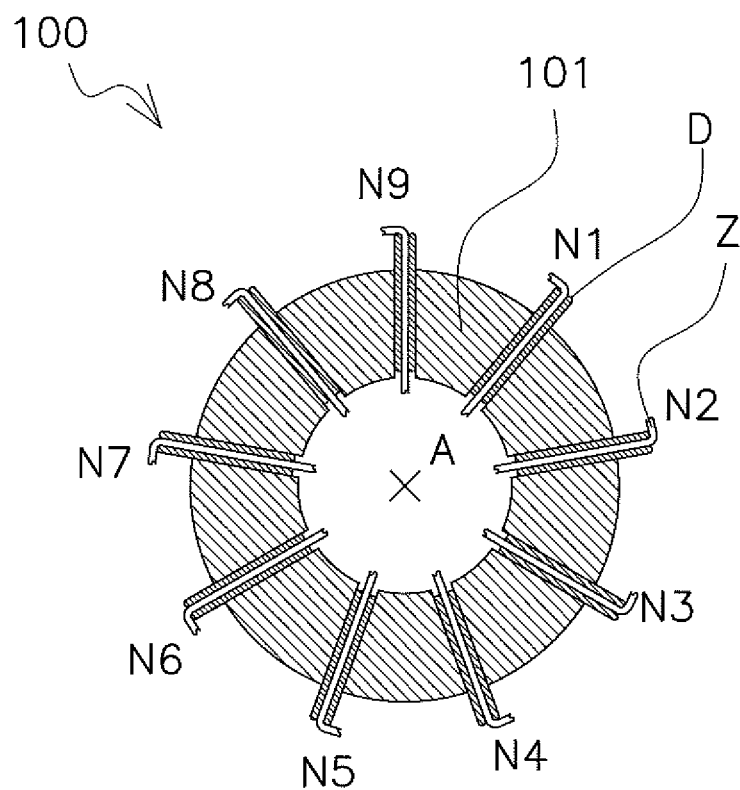
FIG. 4 is a cross-sectional view showing a winding device 100.

Generally, the winding device 100, the cross section of which is shown in FIG. 4, is used to form the winding C in the manufacture of the stator 10. The winding device 100 has a circular body 101, a plurality of nozzles N1 to N9 arranged in a radial direction in the body 101, and fixing tools H1 to H9 which are described hereinafter with reference to FIG. 6.

The body 101 shown in FIG. 4 is able to rotate about the central axis A. Moreover, the body 101 is movable in a direction in which the central axis A extends, i.e., a direction perpendicular to the page of FIG. 4.

Each of the nozzles N1 to N9 ejects a conductive wire Z outward from an ejection port D in a radial direction of the body 101, the conductive wire Z being fed from a conductive wire source which is not shown. Each of the nozzles N1 to N9 is also movable to the outside and inside of the body 101 in the radial direction, and thereby change the radial position of the ejection ports D.

Figure 5:
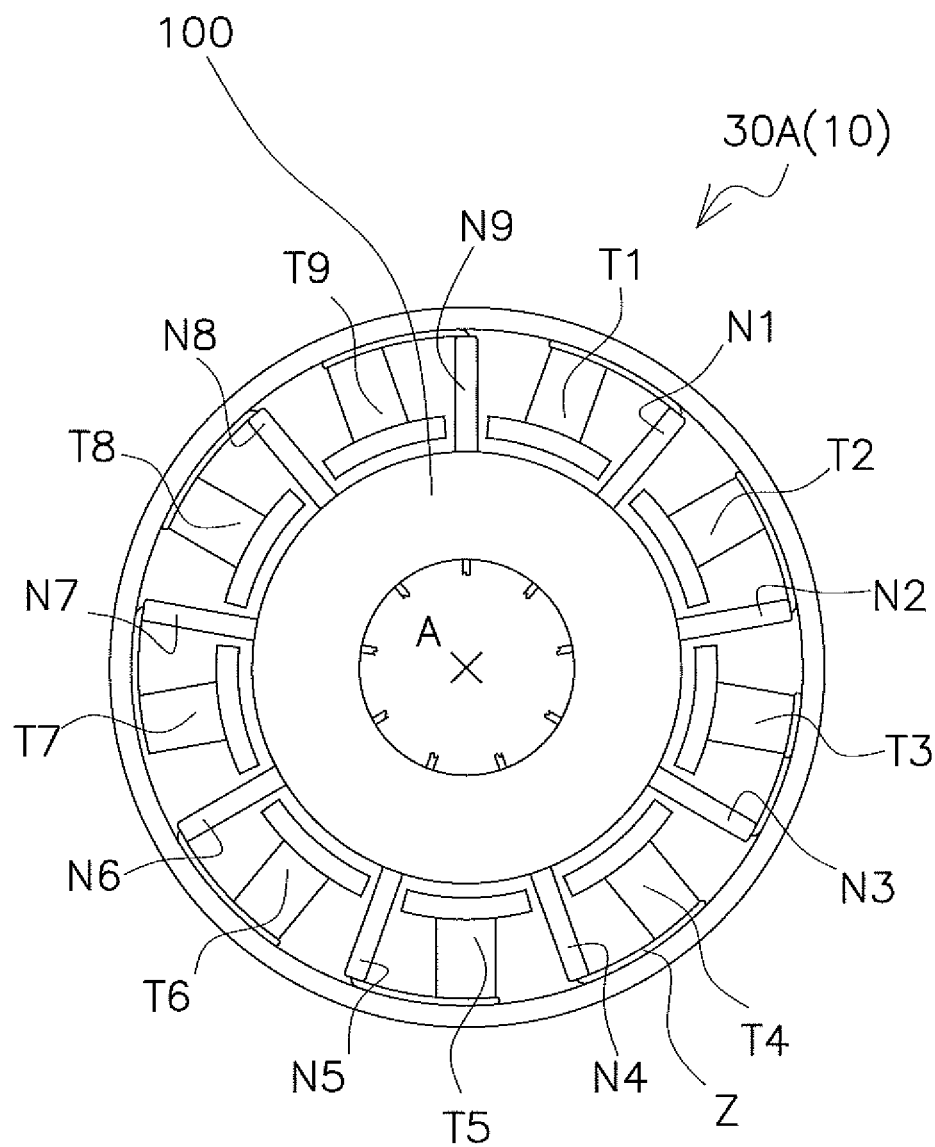
FIG. 5 is a plan view showing an initial step of conventionally forming windings using the winding device 100.

FIG. 5 is a plan view showing an initial step of conventionally forming the winding C using the winding device 100. In this drawing, the two insulators 30A, 30B are stacked on the stator core 20, and the winding device 100 is positioned in the hollow space V of the stator core and the insulators. The drawing only shows the upper insulator 30A provided on the upper surface of the stator core 20, and in the strict sense the teeth T1 to T9 of the stator core are not visible. To enable easy understanding, this drawing shows the reference numerals of the teeth T1 to T9 at the positions of the teeth covers 33 corresponding thereto.

In FIG. 5, the tip of the conductive wire Z ejected from each of the nozzles N1 to N9 is fixed below the stator 10, i.e., below the lower insulator 30B. Each of the nozzles N1 to N9 forms the winding C by revolving around the respective teeth T1 to T9 while ejecting the conductive wires Z. FIG. 5 shows a state in which the nozzles N1 to N9 start revolving from below the stator 10 and then finish half of the revolution cycle.

Figure 6:
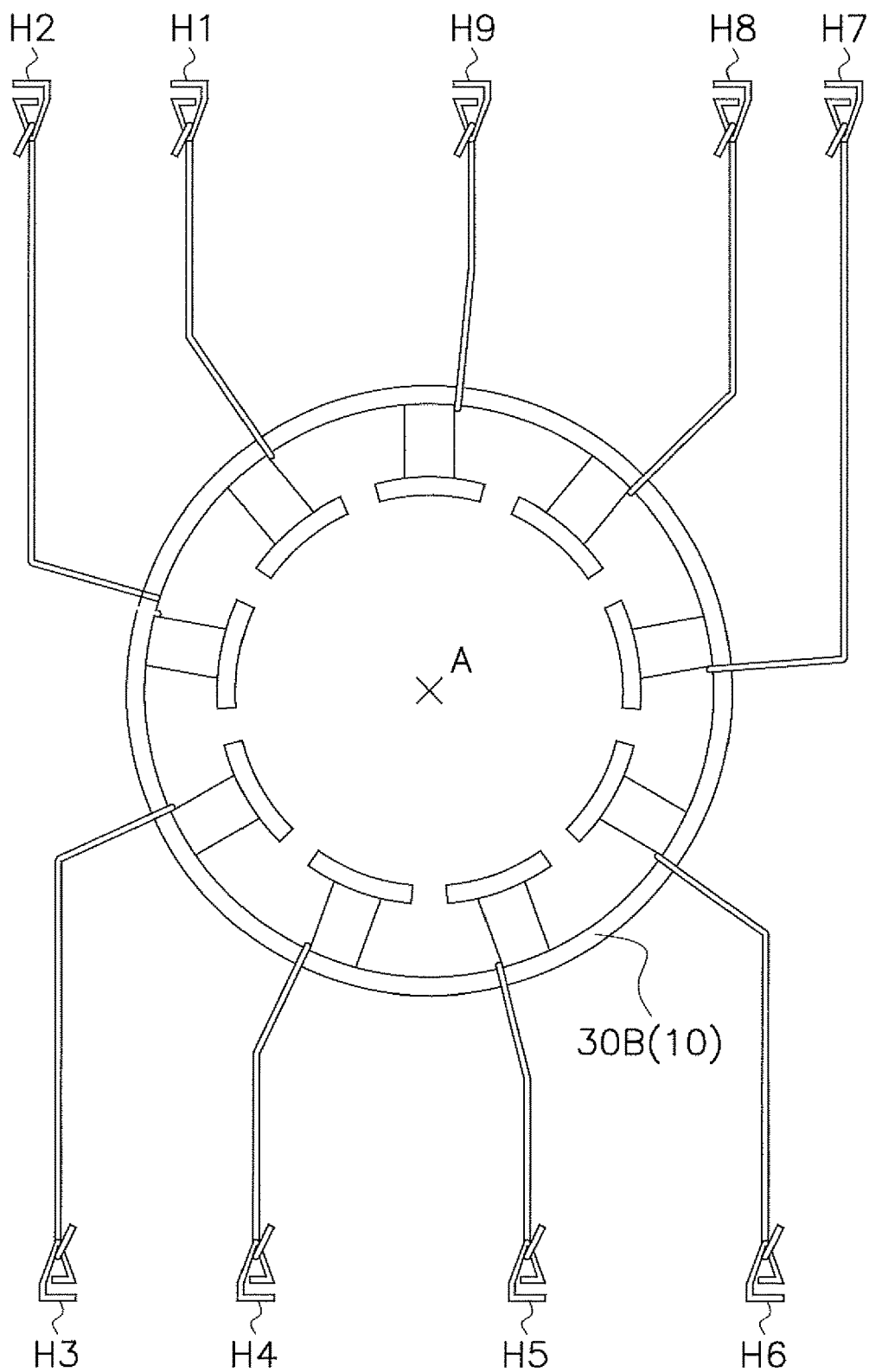
FIG. 6 is a bottom view showing a lower side of a stator in conventionally forming the windings using the winding device 100.

FIG. 6 is a bottom view showing a lower surface of the stator 10 in this state, i.e., the lower insulator 30B. The tips of the conductive wires Z passing through the nozzles N1 to N9 are respectively fixed by the fixing tools H1 to H9.

Figure 7:
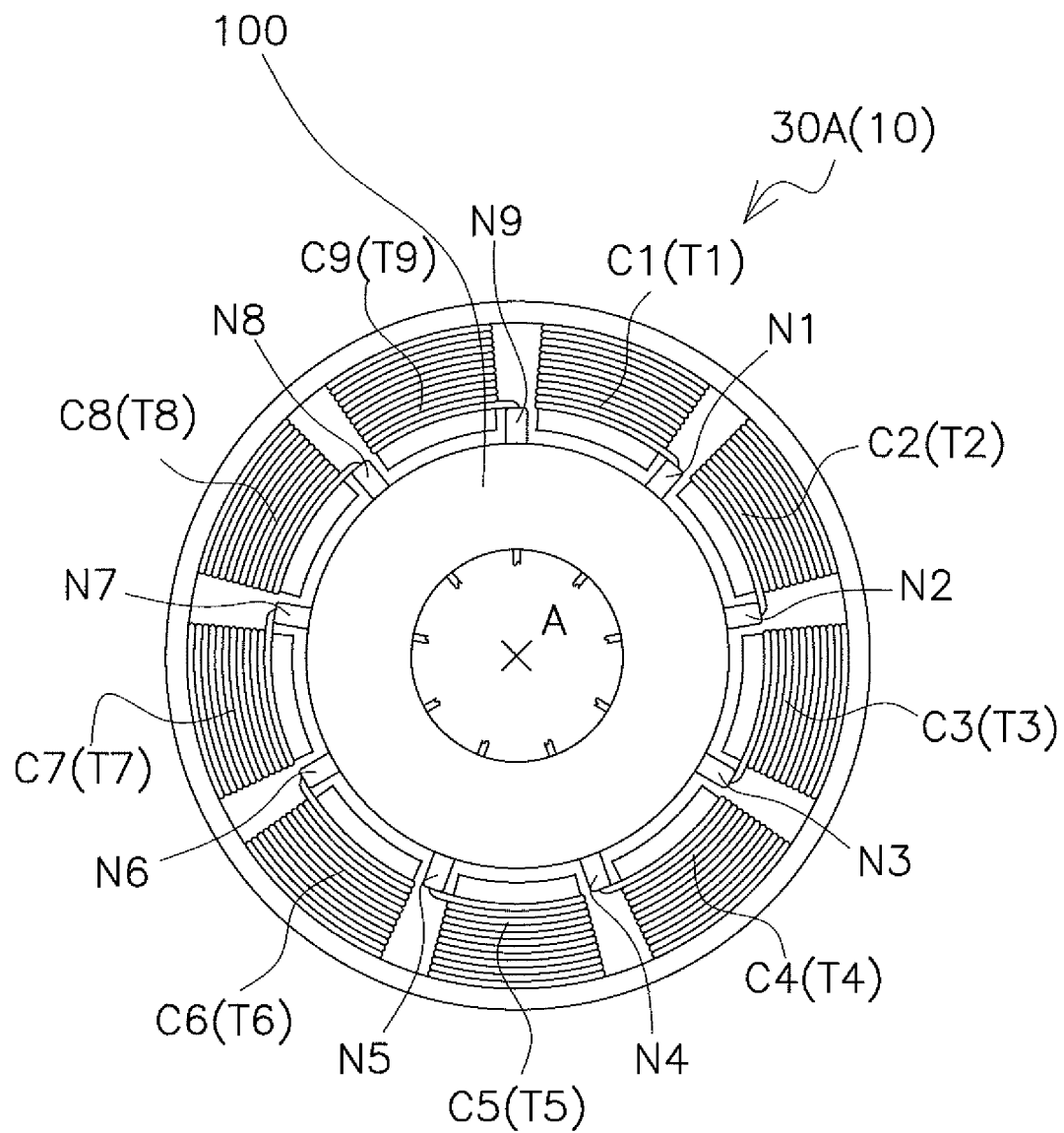
FIG. 7 is a plan view showing a final step of conventionally forming the windings using the winding device 100.

FIG. 7 is a plan view showing a final step of conventionally forming the winding C using the winding device 100. The nozzles N1 to N9 finish many cycles of revolution, and the windings C1 to C9 are formed by winding the conductive wires Z around the teeth T1 to T9.

Figure 8:
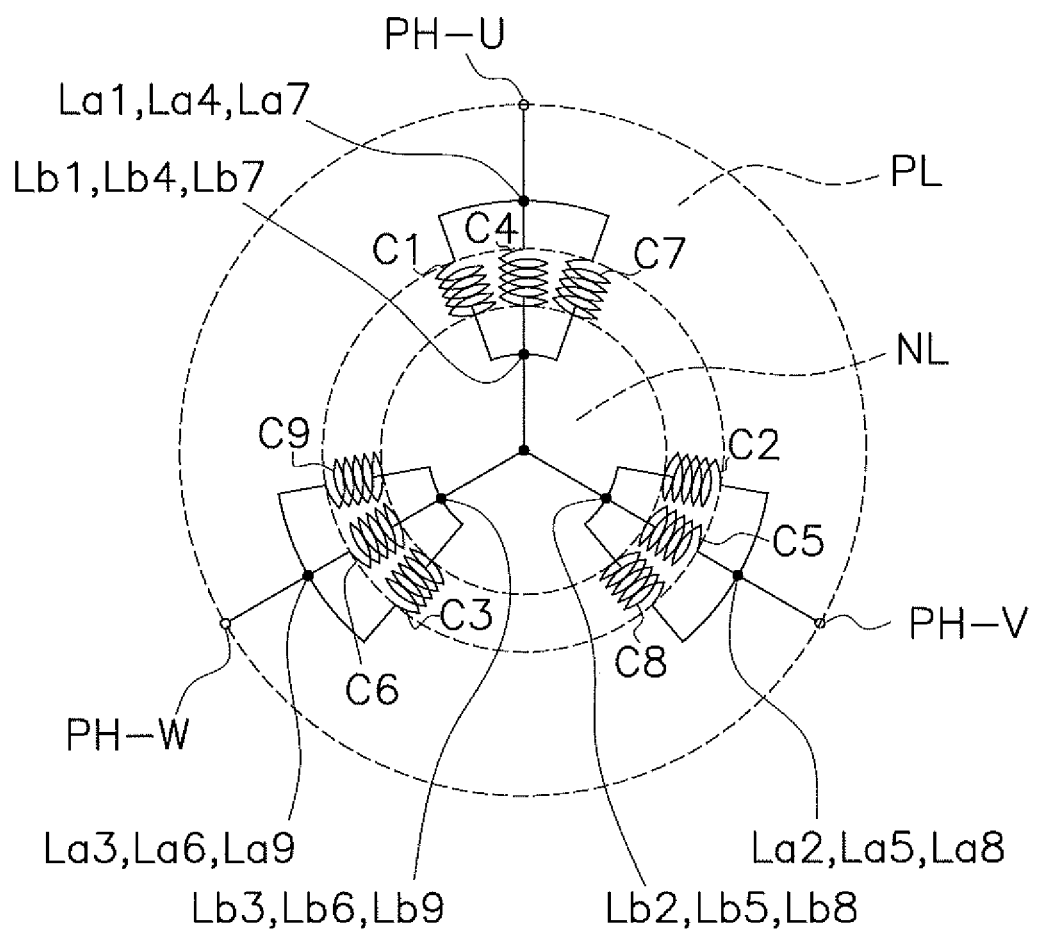
FIG. 8 is a circuit diagram showing wiring of windings C1 to C9.

After forming the windings C1 to C9 using the winding device 100, a connecting step is carried out in order to achieve the wiring shown in FIG. 8. In the connecting step, power lines PL connected to terminals PH-U, PH-V and PH-W and a neutral line NL connecting all of the windings C1 to C9 are formed by connecting two lead wires (outgoing lines) extending from each of the windings C1 to C9. As a result, the stator 10 is completed.

(4) Manufacture of the Stator 10 According to the Present Invention

Figure 9:
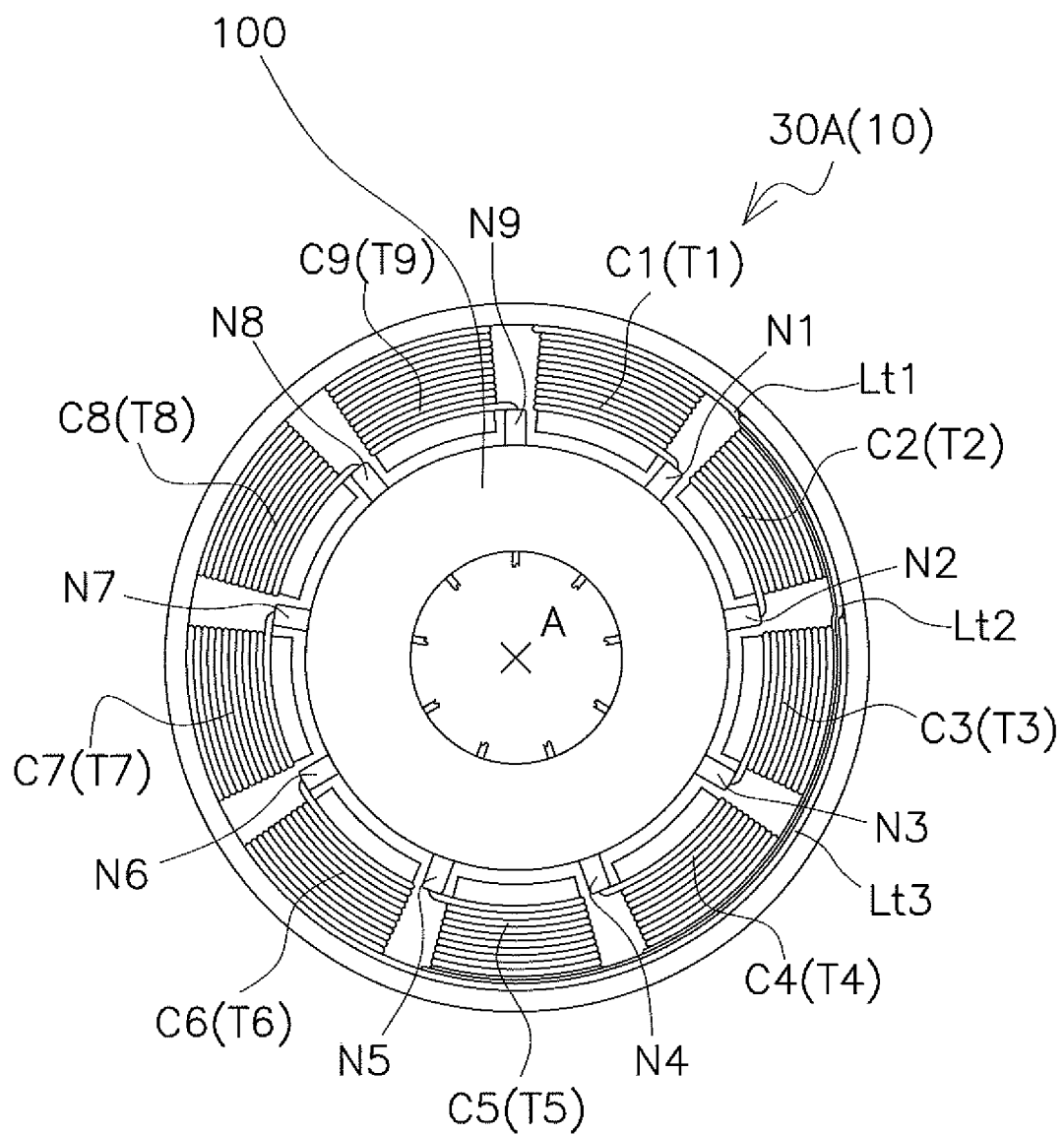
FIG. 9 is a plan view showing the stator 10 according to an embodiment of the present invention.

FIG. 9 is a plan view showing the upper side of the stator 10 according to the present invention. As can be understood from this drawing, three crossover wires (travelling lines) Lt1 to Lt3 extending between different teeth are formed in the stator 10. The first crossover wire Lt1 extends from the tooth T1 to the tooth T4. The second crossover wire Lt2 extends from the tooth T2 to the tooth T5. The third crossover wire Lt3 extends from the tooth T3 to the tooth T6. This stator 10, too, is manufactured using the winding device 100 described above.

FIGS. 10 to 17 respectively show first to eighth steps concerning the manufacture of the stator 10 according to the present invention. In these drawings, a layered product composed of the teeth T1 to T9 and the teeth covers 33 are illustrated as a simple rectangle.

Figure 10:
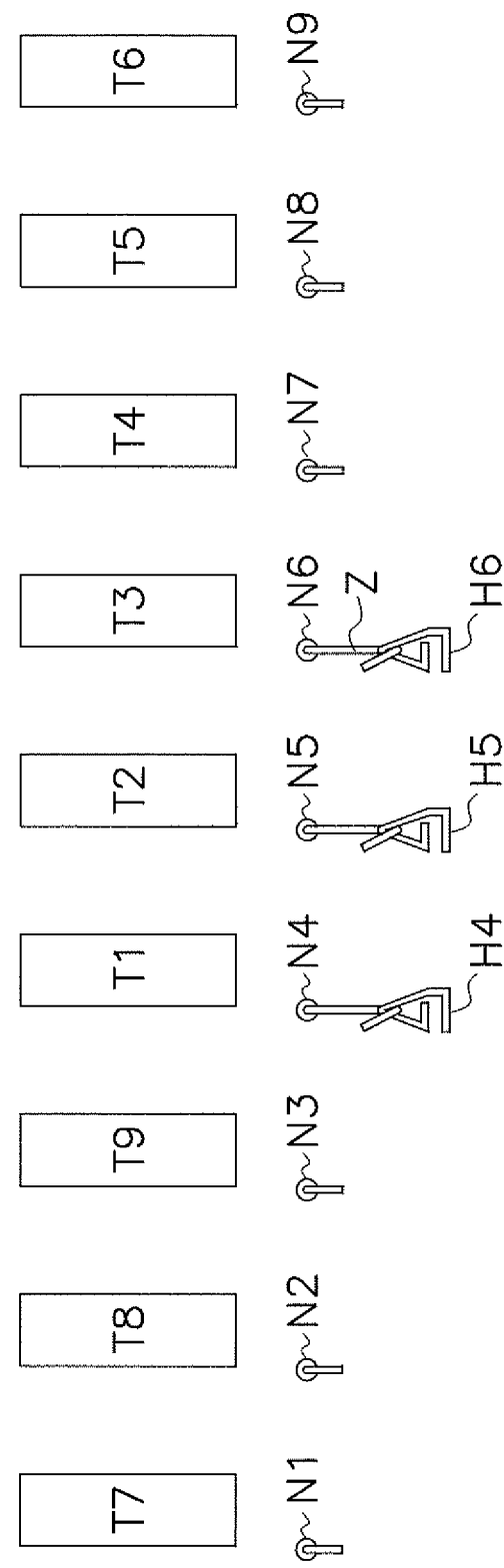
FIG. 10 is a schematic diagram showing a first step of manufacturing the stator 10 according to the present invention.

In the first step shown in FIG. 10, the plurality of nozzles N1 to N9 are located below the stator 10. The stator 10 and the winding device 100 are positioned in such a manner as to form a first relative angle that allows the tooth T1 to come close to the nozzle N4. Only the tips of the conductive wires Z ejected from the nozzles N4 to N6 are fixed to the fixing tools H4 to H6. As to the other nozzles N1 to N3 and N7 to N9, the conductive wires Z thereof are not fixed.

Figure 11:
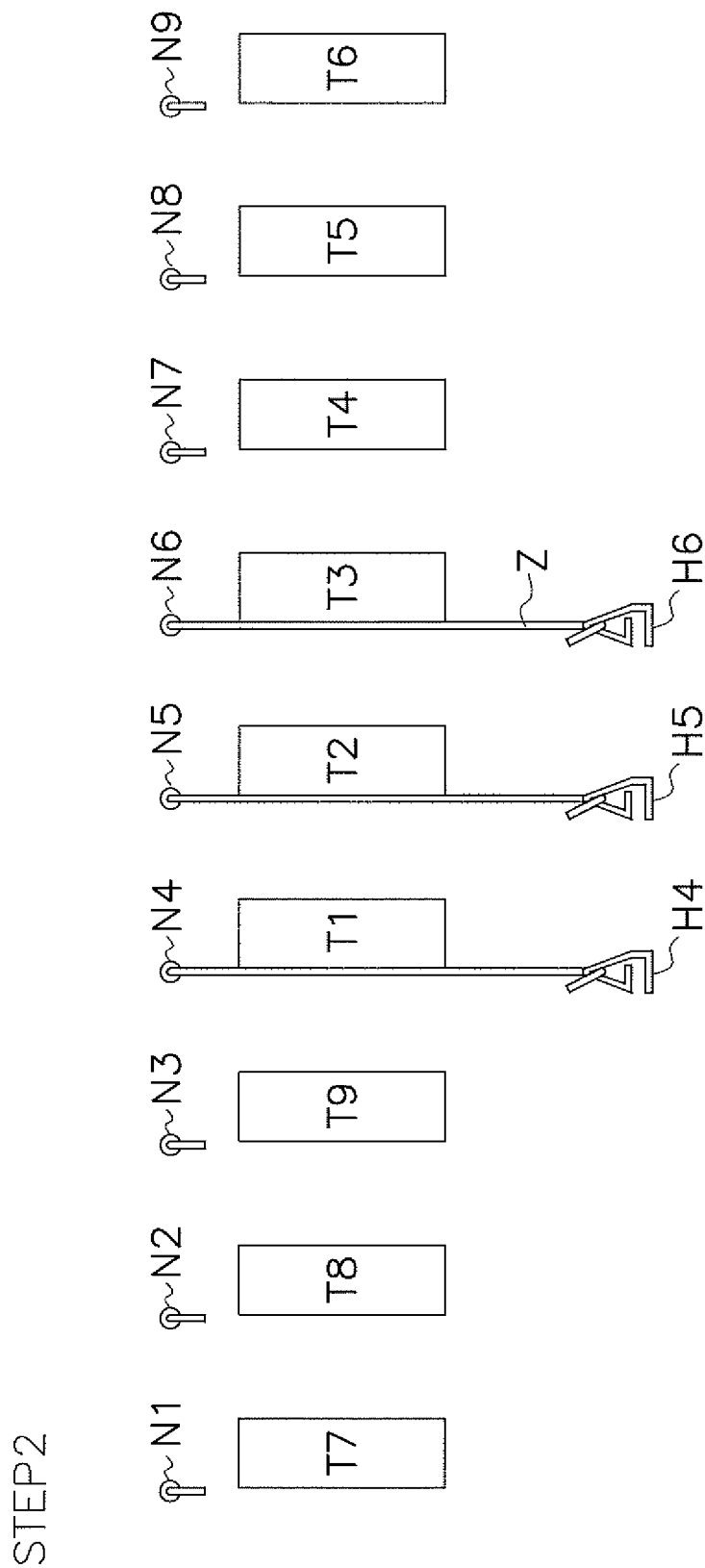
FIG. 11 is a schematic diagram showing a second step of manufacturing the stator 10 according to the present invention.

In the second step shown in FIG. 11, all of the nozzles N1 to N9 move to above the stator 10 along with the body 101 of the winding device 100. Only the conductive wires Z fixed to the fixing tools H4 to H6 are extended in the vicinity of the teeth T1 to T3.

Figure 12:
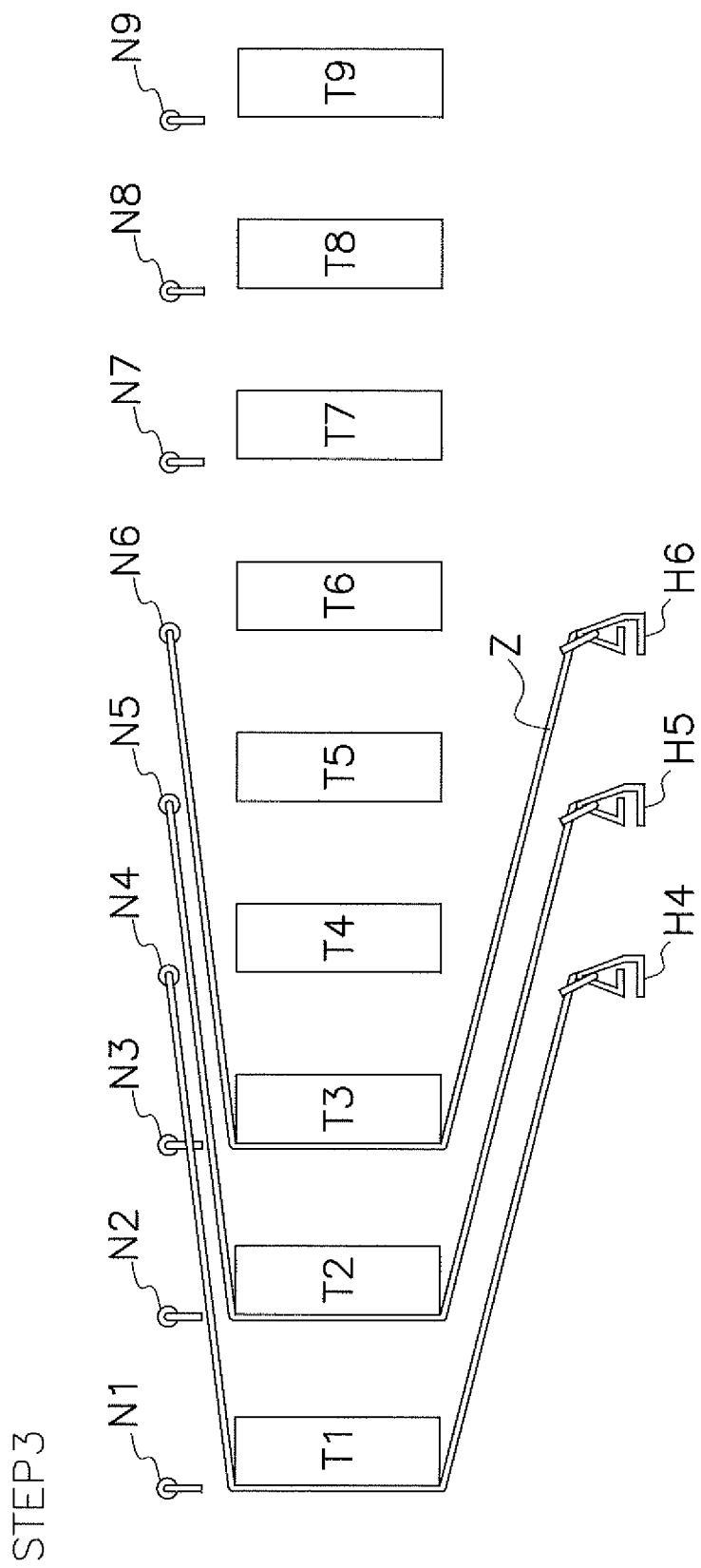
FIG. 12 is a schematic diagram showing a third step of manufacturing the stator 10 according to the present invention.

In the third step shown in FIG. 12, the stator 10 rotates relative to the winding device 100. Accordingly, the stator 10 and the winding device 100 are positioned in such a manner as to form a second relative angle that allows the tooth T1 to come close to the nozzle N1. This rotation causes a significant length of the conductive wires Z to be pulled from the nozzles N4 to N6.

Figure 13:
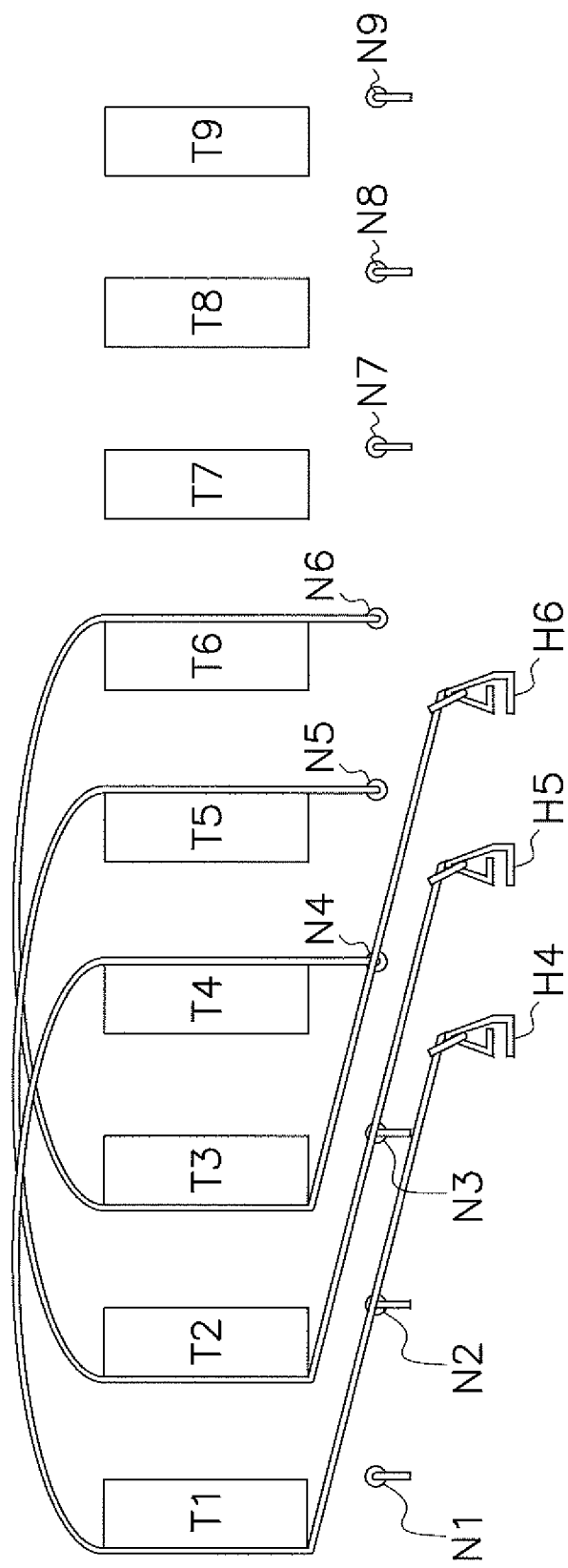
FIG. 13 is a schematic diagram showing a fourth step of manufacturing the stator 10 according to the present invention.

In the fourth step shown in FIG. 13, all of the nozzles N1 to N9 move to below the stator 10 along with the body 101 of the winding device 100. The conductive wires Z fixed to the fixing tools H4 to H6 are not extended in the vicinity of the teeth T1 to T3 but in the vicinity of the teeth T4 to T6.

Figure 14:
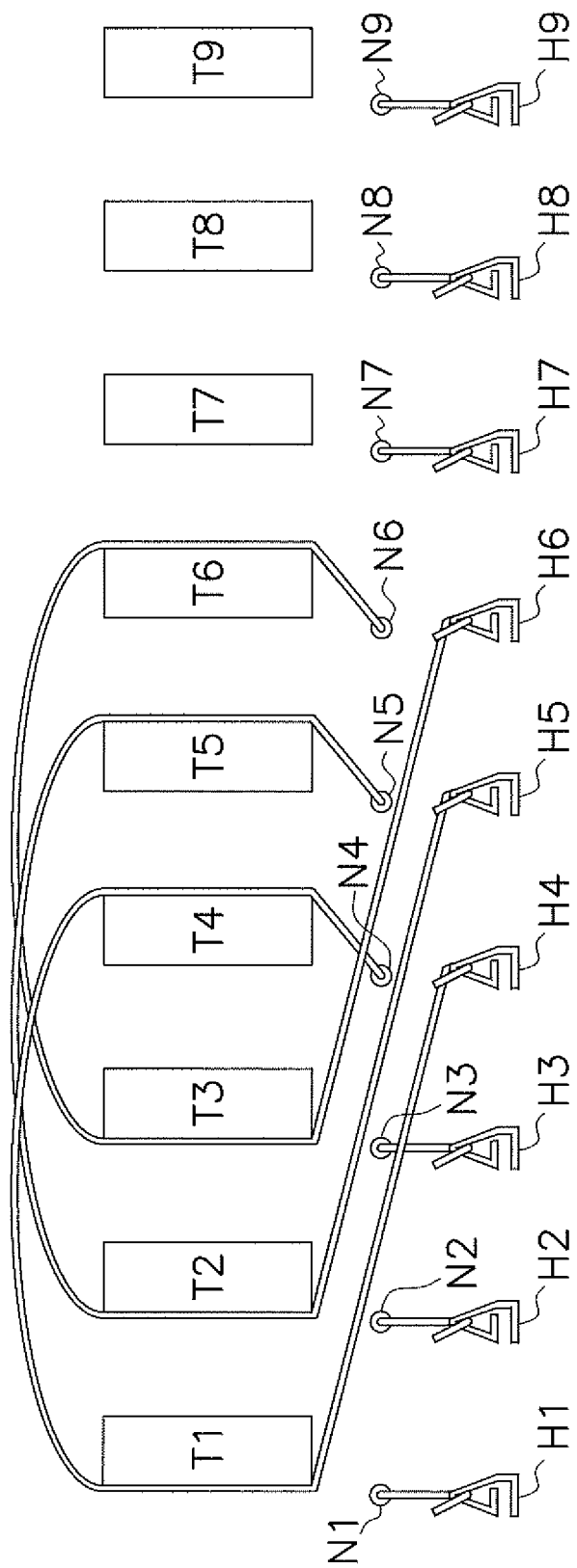
FIG. 14 is a schematic diagram showing a fifth step of manufacturing the stator 10 according to the present invention.

In the fifth step shown in FIG. 14, new conductive wires Z are fixed in the second relative angle using all of the fixing tools H1 to H9. The fixing tools H1 to H9 fix the conductive wires Z ejected from the nozzles N1 to N9, respectively.

Figure 15:
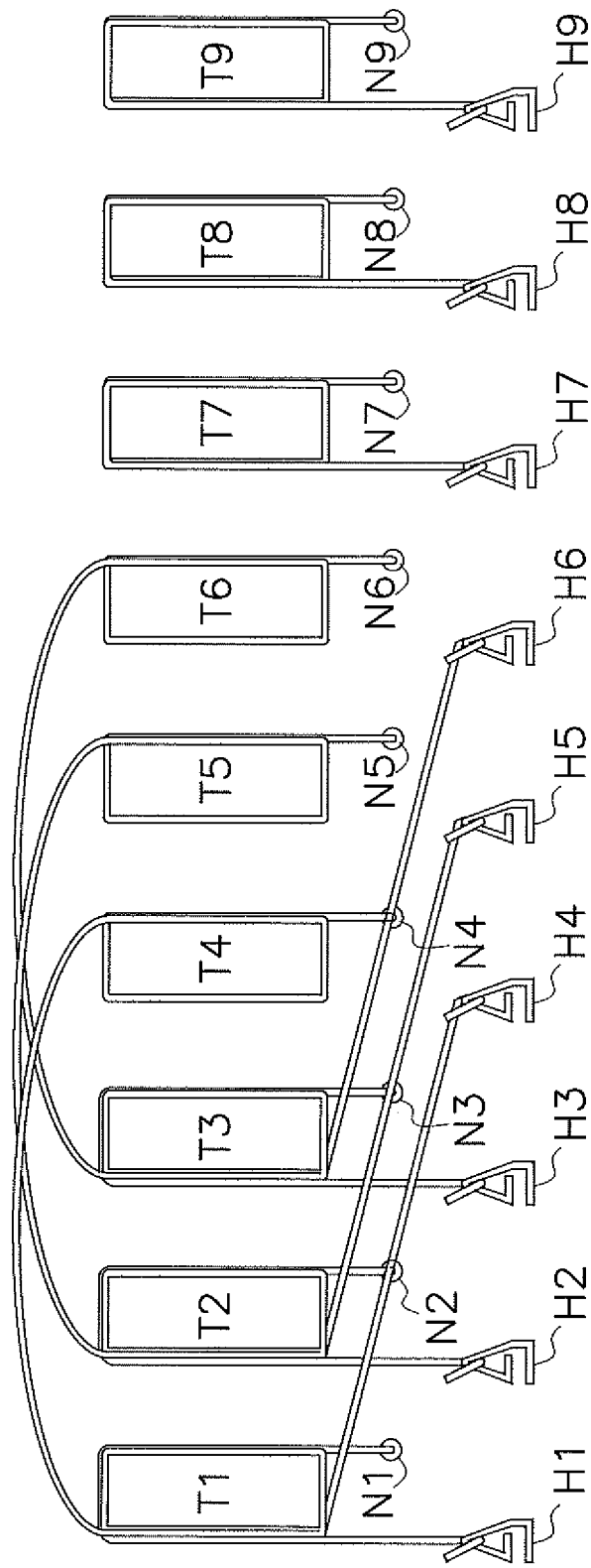
FIG. 15 is a schematic diagram showing a sixth step of manufacturing the stator 10 according to the present invention.

In the sixth step shown in FIG. 15, all of the nozzles N1 to N9 start revolving around the teeth T1 to T9 in the second relative angle. As this revolution repeats, the nozzles N1 to N9 gradually move radially inward with respect to the body 101 in such a manner that the positions of the ejection ports D shown in FIG. 4 gradually come close to the central axis A. Alternatively, the nozzles N1 to N9 may not only move radially inward but also travel back and forth along the radial direction.

Figure 16:
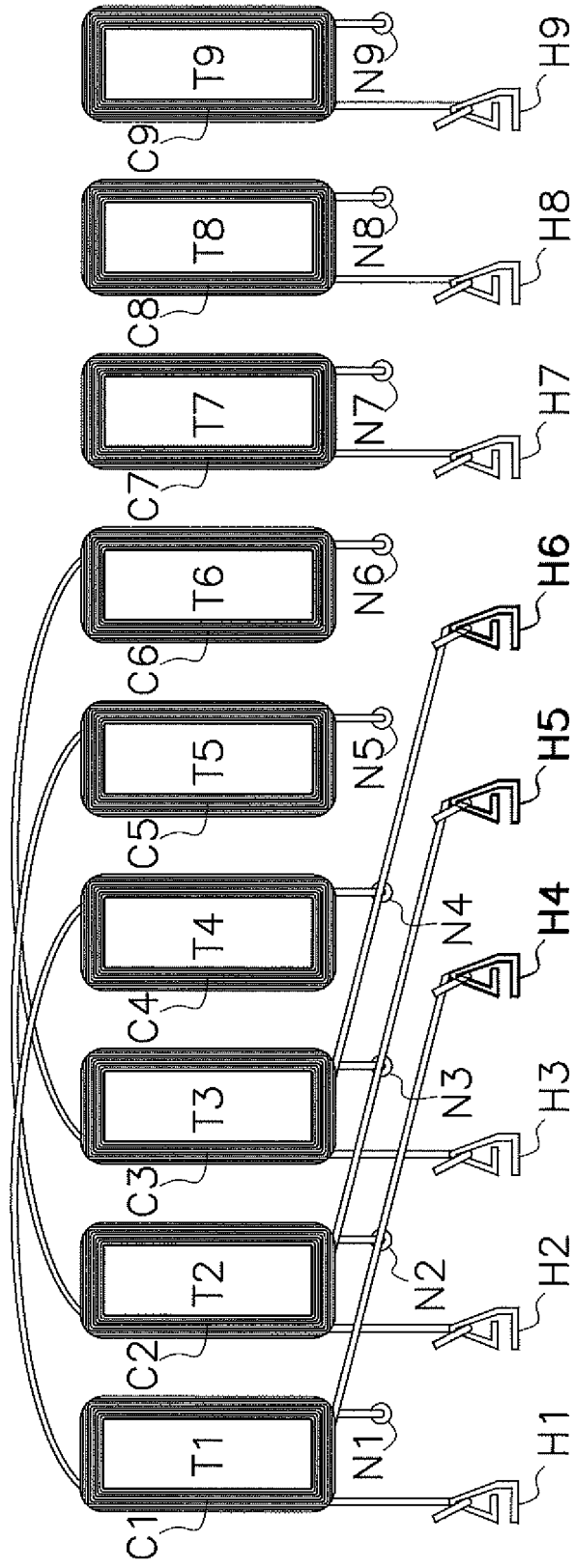
FIG. 16 is a schematic diagram showing a seventh step of manufacturing the stator 10 according to the present invention.

In the seventh step shown in FIG. 16, the nozzles N1 to N9 finish winding the conductive wires Z, forming the windings C1 to C9.

Figure 17:
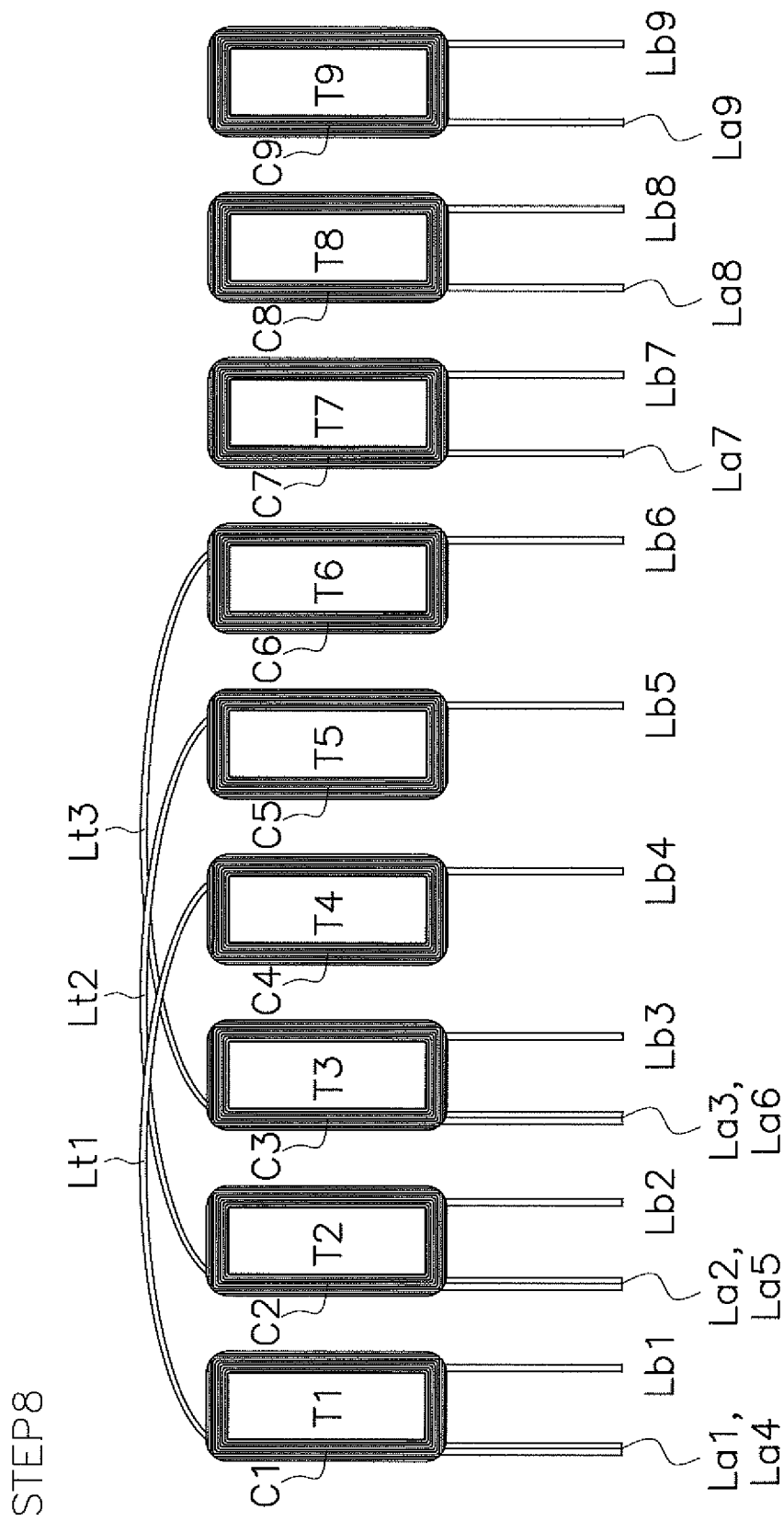
FIG. 17 is a schematic diagram showing an eighth step of manufacturing the stator 10 according to the present invention.

In the eighth step shown in FIG. 17, the conductive wires Z fixed to the fixing tools H1 to H9 are released. The three crossover wires Lt1 to Lt3 described above are formed in the upper part of the stator 10. First lead wires La7 to La9 corresponding to the beginning of winding of the conductive wires Z and second lead wires Lb7 to Lb9 corresponding to the end of winding of the conductive wires Z extend from the teeth T7 to T9 respectively. Only second lead wires Lb4 to Lb6 extend from the teeth T4 to T6 respectively. Pairs of first lead wires La1 to La6 and each of second lead wires Lb1 to Lb3 extend from each of the teeth T1 to T3. The nine first lead wires La1 to La9 and the nine second lead wires Lb1 to Lb9 are connected in the connecting step to achieve the wiring shown in FIG. 8. The wiring is performed as described below.

The first lead wires of the three windings belonging to the U phase, which are namely the first lead wire La1 extending from a U1 winding C1, the first lead wire La4 extending from a U2 winding C4, and the first lead wire La7 extending from a U3 winding C7, are connected to the terminal PH-U, thereby configuring a U-phase power line PL.

The first lead wires of the three windings belonging to the V phase, which are namely the first lead wire La2 extending from a V1 winding C2, the first lead wire La5 extending from a V2 winding C5, and the first lead wire Lab extending from a V3 winding C8, are connected to the terminal PH-V, thereby configuring a V-phase power line PL.

The first lead wires of the three windings belonging to the W phase, which are namely the first lead wire La3 extending from a W1 winding C3, the first lead wire La6 extending from a W2 winding C6, and the first lead wire Lag extending from a W3 winding C9, are connected to the terminal PH-W, thereby configuring a W-phase power line PL.

The second lead wires Lb1 to Lb9 extending from all of the respective windings C1 to C9 respectively are connected together, thereby configuring the neutral line NL.

(5) Characteristics
(5-1)

As shown in FIG. 17, in the stator 10, the two first lead wires La1, La4 of the U1 winding C1 and the U2 winding C4 extend from the same tooth T1. The same is true for the two first lead wires La2, La5 of the V1 winding C2 and the V2 winding C5 and the two first lead wires La3, La6 of the W1 winding C3 and the W2 winding C6.

According to this configuration, a plurality of lead wires to be connected are gathered in the vicinity of the same tooth, restraining wrong lead wires from being connected and improving the efficiency of manufacturing the stator 10.

(5-2)

In the motor 90 with the nine windings C1 to C9, two of the three first lead wires belonging to the same phase are arranged collectively. Such configuration can facilitate connecting the lead wires.

(5-3)

The second lead wires Lb1 to Lb9 extend from the teeth T1 to T9 respectively. This configuration can allow the assembly operator to easily understand that the lead wires that are arranged collectively are the first lead wires.

(5-4)

In the motor 90, the two first lead wires La1, La4 of the U1 winding C1 and the U2 winding C4 extend from the same tooth T1, as shown in FIG. 17. The same is true for the two first lead wires La2, La5 of the V1 winding C2 and the V2 winding C5 and the two first lead wires La3, La6 of the W1 winding C3 and the W2 winding C6.

According to this configuration, a plurality of lead wires to be connected are gathered in the vicinity of the same tooth, restraining wrong lead wires from being connected and improving the efficiency of manufacturing the motor 90.

(5-5)

The crossover wires Lt1 to Lt3 extending between the teeth are formed in the manufacture of the stator 10. According to this manufacturing method, some of the first lead wires to be connected are arranged collectively due to the presence of the crossover wires Lt1 to Lt3. Therefore, not only is it possible to restrain connection of wrong lead wires, but also the efficiency of manufacturing the stator 10 can be improved.

(5-6)

The stator core 20 and the nine nozzles N1 to N9 rotate relative to each other by the central angle corresponding to three teeth. This method improves the efficiency of manufacturing the stator 10 for the 3-phase motor 90. Even when the size of the central angle of the relative rotation is corresponding to an integral multiple of three teeth, such as six teeth or nine teeth, the same effects can be expected.

(5-7)

The crossover wires Lt1 to Lt3 extending between the teeth and the first lead wires La4 to La6 having these crossover wires Lt1 to Lt3 are extended at the stage of starting to wind the conductive wires Z, and held between the windings C1 to C9 to be formed subsequently and the stator core 20. This method can reduce the possibility that the crossover wires Lt1 to Lt3 and the first lead wires La4 to La6 are displaced.

(6) Modifications
(6-1)

According to the foregoing embodiment, only some of the first lead wires belonging to the same phase are arranged collectively. Instead, all of the first lead wires belonging to the same phase may be arranged collectively.

For instance, for the nine windings C1 to C9, all of the first lead wires La1, La4, La1 that extend from the three windings C1, C4, C7 belonging to the U phase may be arranged in the vicinity of the same tooth T1. The same is true for the V phase and the W phase.

According to this configuration, all of the three first lead wires belonging to the same phase are arranged collectively, further facilitating the connection of the lead wires.

(6-2)

According to the foregoing embodiment, the motor 90 has the 3-phase 9-pole windings C1 to C9. Alternatively, the motor may have a different number of windings. For instance, the motor may have 3-phase 12-pole windings. In this case, the U1 winding C1, the U2 winding C4, the U3 winding C7, and a U4 winding C10 belong to the U phase. The V1 winding C2, the V2 winding C5, the V3 winding C8, and the V4 winding C11 belong to the V phase. The W1 winding C3, the W2 winding C6, the W3 winding C9, and the W4 winding C12 belong to the W phase.

According to this configuration, the first lead wires La1 to La12 may be arranged as follows.

[U phase] The two first lead wires La1, La4 of the U1 winding C1 and the U2 winding C4 extend from the same tooth T1. The two first lead wires La1, La10 of the U3 winding C7 and the U4 winding C4 extend from the same tooth T7.

[V phase] The two first lead wires La2, La5 of the V1 winding C2 and the V2 winding C5 extend from the same tooth T2. The two first lead wires La8, La11 of the V3 winding C8 and the V4 winding C11 extend from the same tooth T8.

[W phase] The two first lead wires La3, La6 of the W1 winding C3 and the W2 winding C6 extend from the same tooth T3. The two first lead wires La9, La12 of the W3 winding C9 and the W4 winding C12 extend from the same tooth T9.

According to this configuration, the first lead wires belonging to the same phase are arranged collectively in the motor having the twelve windings C1 to C12. This configuration can further facilitate connecting the lead wires.

(6-3)

According to the foregoing embodiment, the first lead wires La1 to La9 that are wound first around the respective windings C1 to C9 constitute the power lines PL, and the second lead wires Lb1 to Lb9 that are wound around the windings C1 to C9 at the end constitute the neutral line NL. Alternatively, the first lead wires La1 to La9 may be constitute the neutral line NL and the second lead wires Lb1 to Lb9 may constitute the power lines PL.

INDUSTRIAL APPLICABILITY

The present invention can be applied widely to various types of motors, including motors to be mounted on compressors of refrigerating apparatuses.

What is claimed is:

1. A stator for a simultaneous concentrated winding motor, the stator comprising:
    a core having 3×m teeth, with m representing an integer greater than or equal to 2;
    3×m windings each corresponding to a U phase, a V phase, or a W phase, the windings being arranged on the teeth, respectively, the 3×m windings including at least
        a U1 winding and a U2 winding that belong to the U phase,
        a V1 winding and a V2 winding that belong to the V phase, and
        a W1 winding and a W2 winding that belong to the W phase; and
    a plurality of first lead wires and a plurality of second lead wires that extend from the windings, respectively,
    the first lead wires of the U1 winding, the V1 winding, and the W1 winding extending, respectively, from the teeth on which the U1 winding, the V1 winding, and the W1 winding are arranged,
    the first lead wires of the U2 winding, the V2 winding, and the W2 winding extending, respectively, from the teeth on which the U1 winding, the V1 winding, and the W1 winding are arranged,
    the 3×m windings further including
        a U3 winding belonging to the U phase,
        a V3 winding belonging to the V phase, and
        a W3 winding belonging to the W phase,
    the 3×m windings being simultaneously wound around the teeth, and
    the first lead wires of the U3 winding, the V3 winding, and the W3 winding extending, respectively, from the teeth on which the U3 winding, the V3 winding, and the W3 winding are arranged.

2. The stator according to claim 1, wherein the 3×m windings further include
    a U4 winding that belong to the U phase,
    a V4 winding that belong to the V phase, and
    a W4 winding that belong to the W phase, and
    the first lead wires of the U4 winding, the V4 winding, and the W4 winding extend, respectively, from the teeth on which the U3 winding, the V3 winding, and the W3 winding are arranged.

3. The stator according to claim 2, wherein all of the second lead wires of the 3×m windings extend, respectively, from the teeth on which these windings are arranged.

4. A motor including the stator according to claim 2, the motor further comprising
    a rotor that has a permanent magnet that magnetically interacts with the stator.

5. The stator according to claim 1, wherein all of the second lead wires of the 3×m windings extend, respectively, from the teeth on which these windings are arranged.

6. A motor including the stator according to claim 5, the motor further comprising
    a rotor that has a permanent magnet that magnetically interacts with the stator.

7. A motor including the stator according to claim 1, the motor further comprising
    a rotor that has a permanent magnet that magnetically interacts with the stator.

8. The stator according to claim 1, wherein all of the second lead wires of the 3×m windings extend, respectively, from the teeth on which these windings are arranged.

9. A motor including the stator according to claim 1, the motor further comprising
    a rotor that has a permanent magnet that magnetically interacts with the stator.

10. A method for manufacturing a stator by winding 3×m conductive wires around 3×m teeth of a core, thereby forming 3×in windings surrounding the teeth and 6×m lead wires extending from both ends of each of the windings, with m being an integer greater than or equal to 2, the 6×m lead wires including plurality of first lead wires and a plurality of second lead wires that extend from the windings, respectively, the 3×m windings including at least a U1 winding, a U2 winding and a U3 winding that belong to a U phase, a V1 winding, a V2 winding and a V3 winding that belong to a V phase, and a W1 winding, a W2 winding and a W3 winding that belong to a W phase, the 3×m windings being simultaneous wound around the teeth and the first lead wires of the U2 winding, the V2 winding, and the W2 winding extending, respectively, from the teeth on which the U1 winding, the V1 winding, and the W1 winding, are arranged, the method comprising:

preparing a winding device having 3×m nozzles movable around the teeth while ejecting the 3×m conductive wires in a radial direction;

forming a first relative angle between the winding device and the core;

fixing some of the 3×m conductive wires using fixing tools and leaving the rest of the conductive wires unfixed;

moving each of the 3×m nozzles around one of the 3×m teeth;

forming a second relative angle between the winding device and the core by causing the winding device to rotate relatively about a central axis of the core;

fixing all of the 3×m conductive wires using fixing tools; and moving each of the 3×m nozzles around one of the 3×m teeth.

11. The method according to claim 10, wherein the core and the winding device rotate relative to each other by a central angle corresponding to an integral multiple of three of the teeth.

12. The method according to claim 11, wherein the 3×m windings are formed in a state in which the winding device and the core form the second relative angle.

13. The method according to claim 10, wherein the 3×m windings are formed in a state in which the winding device and the core form the second relative angle.

* * * * *